US007887109B2

(12) United States Patent
Liao

(10) Patent No.: US 7,887,109 B2
(45) Date of Patent: Feb. 15, 2011

(54) STEPWISE POWERFUL SUCTION DEVICE

(75) Inventor: Po-Lin Liao, Taichung (TW)

(73) Assignee: Lih Yann Industrial Co. Ltd., Taichung (TW)

( * ) Notice: Subject to any disclaimer, the term of this patent is extended or adjusted under 35 U.S.C. 154(b) by 158 days.

(21) Appl. No.: 12/325,848

(22) Filed: Dec. 1, 2008

(65) Prior Publication Data

US 2010/0133863 A1 Jun. 3, 2010

(51) Int. Cl.
*B66C 1/02* (2006.01)
*A47J 45/00* (2006.01)

(52) U.S. Cl. .................................................... 294/64.1

(58) Field of Classification Search ................. 294/64.1
See application file for complete search history.

(56) References Cited

U.S. PATENT DOCUMENTS

| | | | | |
|---|---|---|---|---|
| 2,127,154 | A * | 8/1938 | Burk | 294/64.1 |
| 2,131,687 | A * | 9/1938 | Kaplan | 294/64.1 |
| 2,212,755 | A * | 8/1940 | Solomon | 294/64.1 |
| 2,287,576 | A * | 6/1942 | Solomon | 294/64.1 |
| 2,351,666 | A * | 6/1944 | Cohen | 294/64.1 |
| 2,420,811 | A * | 5/1947 | Brewster et al. | 294/64.1 |
| 3,219,377 | A * | 11/1965 | Allen | 294/64.1 |
| 4,932,701 | A * | 6/1990 | Cornillier et al. | 294/64.1 |
| 5,042,418 | A * | 8/1991 | Hoover et al. | 248/542 |
| 5,407,338 | A * | 4/1995 | Callahan et al. | 425/12 |

* cited by examiner

*Primary Examiner*—Paul T Chin
(74) *Attorney, Agent, or Firm*—Muncy, Geissler, Olds & Lowe, PLLC

(57) ABSTRACT

A stepwise powerful suction device includes suction holders, suction elements, resilient elements, a support frame, and rotary knobs. The support frame and the three suction holders are integrally formed together. A portion of the support frame forms a handle. Each suction element forms an upright post extending through the respective resilient element and suction holder. Each suction holder forms a multi-step stepwise recess, and each rotary knob has a handgrip that forms a multi-step stepwise projection overlappingly engaging the multi-step stepwise recess and including a safety button, a spacer ring, and a bolt extending through the handgrip of the rotary knob to engage an inner-threaded hole defined in the respective suction element. Each suction holder forms a stop, and the handgrip of the respective rotary knob forms a counterpart raised portion.

11 Claims, 13 Drawing Sheets

STEPWISE POWERFUL SUCTION DEVICE

BACKGROUND OF THE INVENTION

1. Field of the Invention

The present invention relates to a suction device, and in particular to a stepwise powerful suction device that is controlled to selectively generate suction forces of different magnitudes for different applications in holding panels or boards of different thicknesses.

2. The Related Arts

FIGS. 1 and 2 of the attached drawings illustrate a conventional suction device, which comprises two suction holders 11, two suction elements 12, two springs 13, two switch levers 14 and a support frame 15. A portion of the support frame 15 forms a handle. Each suction holder 11 forms a central hole 112 and has a top forming a platform 111. The suction element 12 is made of a deformable material and forms an upright post 122. The upright post 122 forms at an upper end section thereof a pin hole 123 that receives therein a pin 124. Each switch lever 14 has an end forming a pivoting portion 141 in which a pivot hole 143 is defined. The pivoting portion 141 also has a camming edge 142. The spring 13 encompasses the upright post 122 of the suction element 12. The upright post 122 of the suction element 12 extends through the hole 112 of the suction holder to position the suction element 12 under the bottom of the suction holder 11 with the spring 13 normally biasing the suction element 12 away from the bottom of the suction holder 11. The upright post 122 is set to have the pin hole 123 thereof aligned with pivot hole 143 of the switch lever 14 to allow the pin 124 to extend through both, whereby the switch lever 14 is rotatable with respect to the suction holder 11. In operation, the rotatable and thus position-changeable switch lever 14 is arranged to have the camming edge 142 thereof engaging the platform 111 of the suction holder 11 so that rotation of the switch lever 14 causes, via the pivotal joint thereof with the upright post 122, the suction element 12 to be forced upward. With the suction element 12 positioned on a smooth surface of for example a glass panel or a board or the likes, vacuum is induced inside the suction element 12 thereby generating a suction force to hold the glass panel or the board to the suction element 12.

The conventional suction device has disadvantages. For example, the suction force so induced by the suction element is not adjustable so that it only provides a constant magnitude. This works for holding thick glass panels or thick boards that are capable to endure a large force without breaking or fracture, but when applied to a glass panel or a board of a small thickness, which is capable to sustain a large force, the fixed magnitude suction force generated by the conventional suction device may unexpectedly break the glass panel or board, leading to property loss or even damage to people.

In view of the above discussed drawbacks, it is desired to have a suction device that overcomes the above problems.

SUMMARY OF THE INVENTION

Thus, the present invention aims to solve the problem that the conventional suction device provides only a fixed-magnitude suction force by switching a lever to lift an upright post of a suction element and that the suction force is not adjustable and is thus only applicable to panels or boards of sufficient thicknesses and not applicable to panels or boards of small thicknesses that may be broken by the fixed magnitude of the suction force.

To solve such problems and drawbacks, the present invention provides a stepwise powerful suction device comprising a plurality of suction holders, a plurality of suction elements, a plurality of resilient elements, a support frame, and a plurality of rotary knobs. The support frame and the rotary knobs are integrally formed together. A portion of the support frame forms a handle. Each suction element has an upright post extending through the corresponding resilient element and the corresponding suction holder. Each suction holder forms a multi-step stepwise recess and the corresponding rotary knob has a handgrip forming a multi-step stepwise projection mating the multi-step stepwise recess in a stacked manner. Safety locking means is provided between the multi-step stepwise recess and the multi-step stepwise projection. A spacer ring and a bolt are received in a bore of the handgrip to secure the upright post of the suction element to the handgrip. The suction holder forms a stop on an outside surface thereof and the handgrip forms a corresponding raised portion. When the handgrip is switched by rotation from a neutral position to a first engaging position, the multi-step stepwise projection is caused to move respect to the multi-step stepwise recess to have steps of multi-step stepwise projection engaging different steps of the multi-step stepwise recess thereby moving the suction element upward by a first distance that induce a first magnitude of suction force. Further rotation of the handgrip toward subsequent engaging positions causes the multi-step stepwise projection to set at different steps of the multi-step stepwise recess and lifting the suction element by different distances that induces different magnitudes of the suction force. This allows the suction device of the present invention to be applicable to panels or boards of different size without applying excessive suction force thereto.

The effectiveness of the present invention is that, compared to the conventional suction device that generates only a fixed magnitude suction force that is only applicable to panels or boards of sufficient thicknesses and may break panels or boards of small thicknesses, the stepwise suction device of the present invention is controllable to provide a suction force of various magnitudes for applications to panels or boards of a wide range of thickness without applying an excessive force to undesirably cause breaking of the panel or board held thereby.

BRIEF DESCRIPTION OF THE DRAWINGS

The present invention will be apparent to those skilled in the art by reading the following description of a preferred embodiment thereof, with reference to the attached drawings, wherein.

DETAILED DESCRIPTION OF THE PREFERRED EMBODIMENTS

Figure 1:
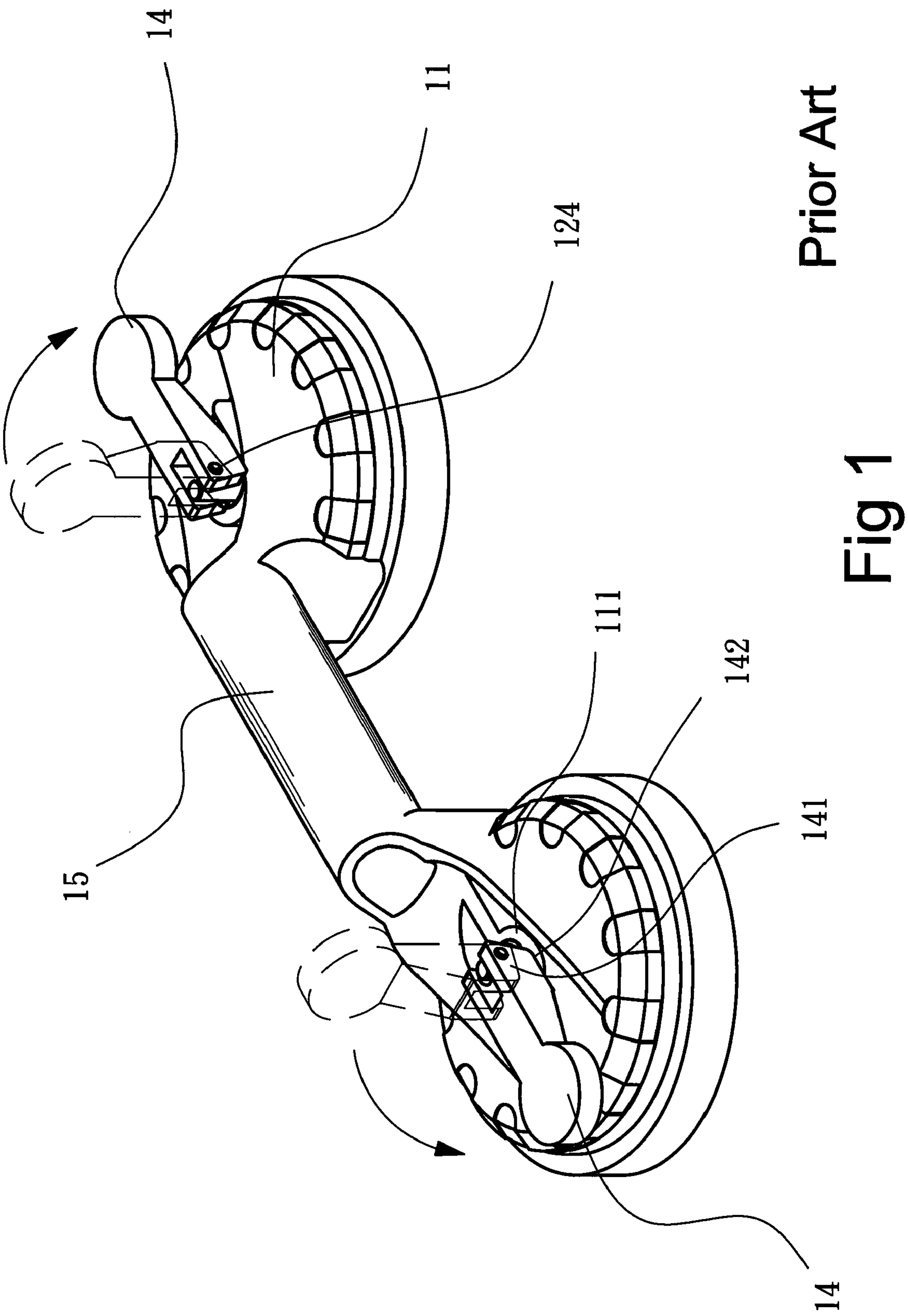
Prior Art Fig 1
FIG. 1 is a perspective view of a conventional two-suction-element suction device.
Figure 2:
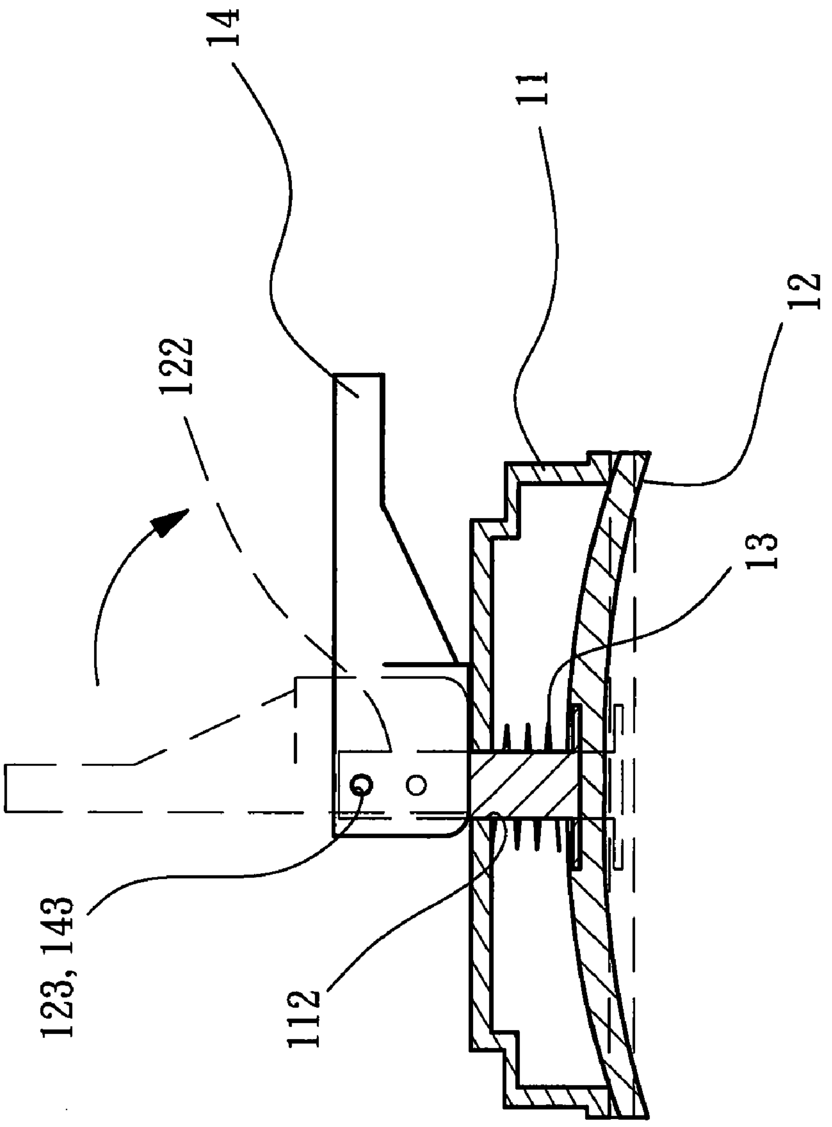
Fig 2 Prior Art
FIG. 2 is a cross-sectional view of the conventional suction device illustrating the operation of the suction element thereof.
Figure 3:
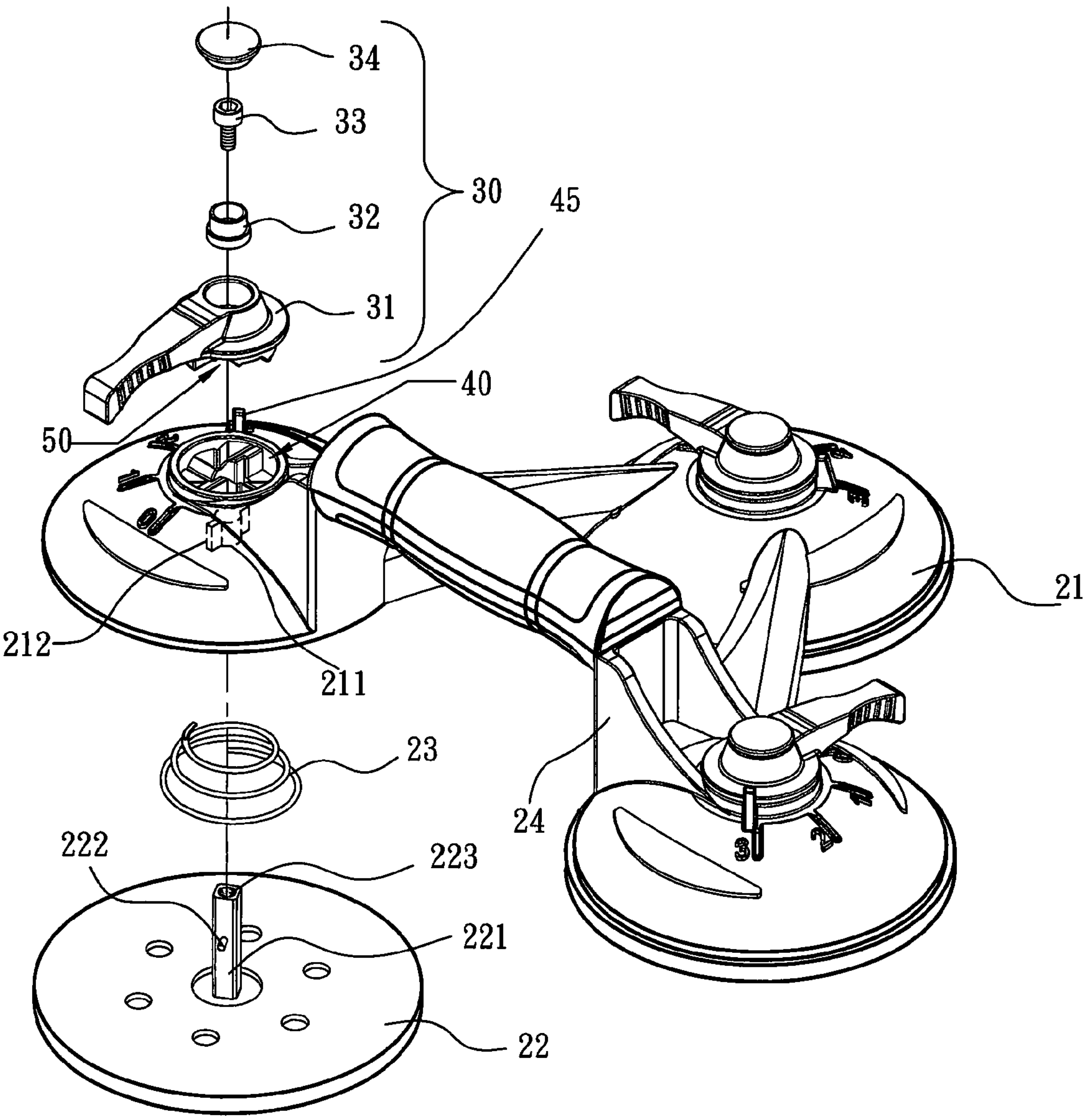
FIG. 3 is an exploded view of a stepwise powerful suction device constructed in accordance with a preferred embodiment of the present invention.
Figure 4:
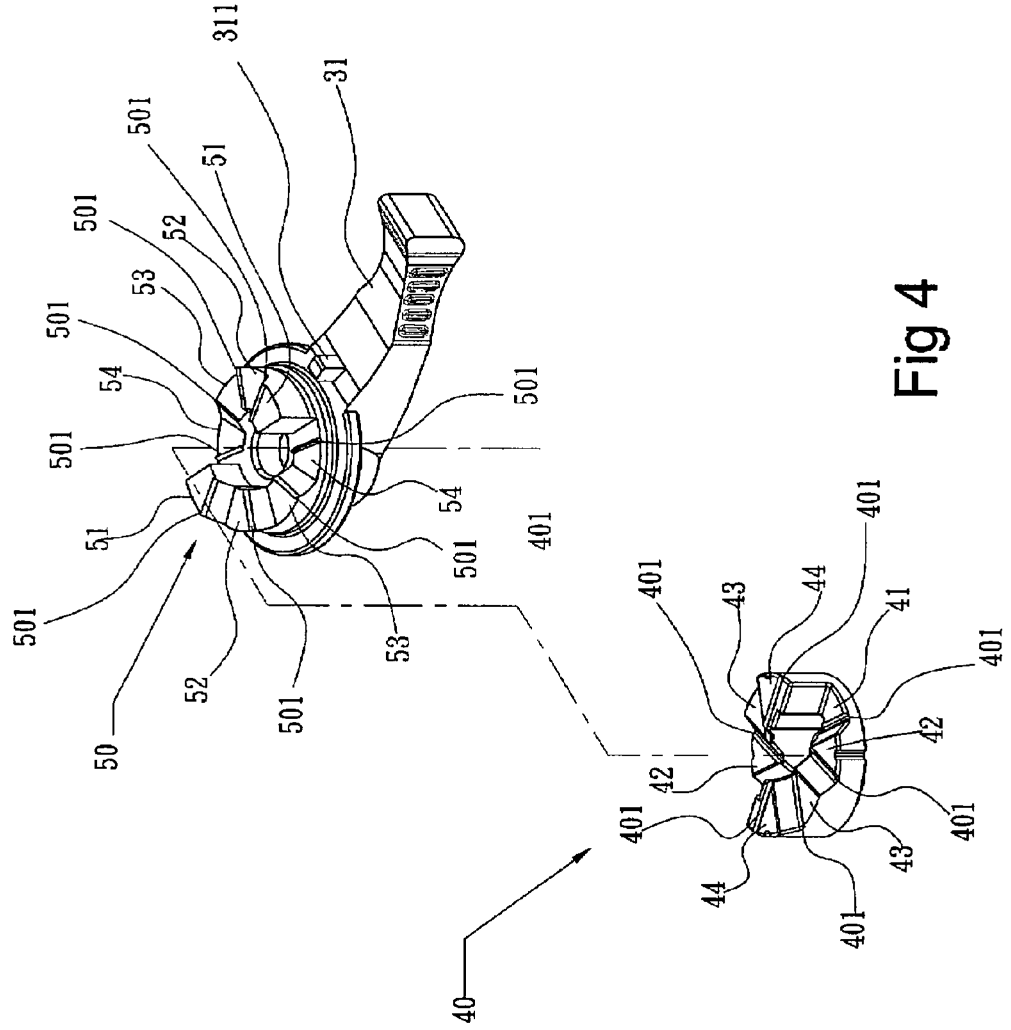
FIG. 4 is a perspective view illustrating an arrangement of a multi-step stepwise recess and a multi-step stepwise projection of the stepwise powerful suction device of the present invention.
Figure 4A:
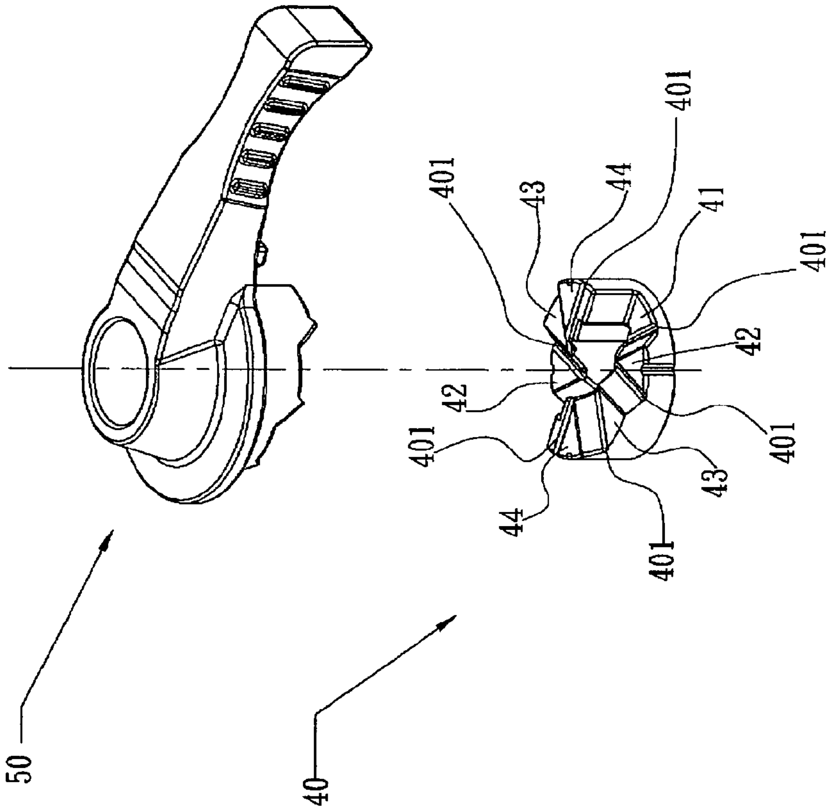
FIG. 4A is view illustrating spatial relationship between the multi-step stepwise recess and multi-step stepwise projection.

The present invention provides a stepwise powerful suction device, which is particularly illustrated in FIGS. 3, 4, and 4A, which are respectively an exploded view of the stepwise powerful suction device in accordance with a preferred embodiment of the present invention, a perspective view illustrating an arrangement of a multi-step stepwise recess and a multi-step stepwise projection of the stepwise powerful suction device of the present invention, and a view illustrating spatial relationship between the multi-step stepwise recess and projection. The suction device in accordance with the first embodiment of the present invention comprises three suction holders 21, three suction elements 22, three resilient elements 23, a support frame 24, and three rotary knobs 30. The resilient elements 23 are compression springs. The support frame 24 and the three suction holders 21 are fixed together, preferably by being integrally molded or otherwise integrally formed together. A portion of the support frame 24 forms a handle. Each suction holder 21 forms a central bore 211 and a multi-step stepwise recess 40, preferably arranged in a concentric manner. The central bore 211 has an inside surface in which slots 212, preferably opposite to each other, are defined for slidably receiving guide pegs 222 (which will be described hereinafter) therein. The multi-step stepwise recess 40 is comprised of two sets of a first step 41, which is of a greatest depth, a second step 42, which is of a second greatest depth, a third step 43, which is of a second shallowest depth, and a fourth step 44, which is of a shallowest depth. The steps 41, 42, 43, 44 of the two sets are circumferentially arranged, preferably equally spaced, and respectively correspond at least eight sequentially arranged position marks, respectively denoted as 0, 1, 2, 3, 0, 1, 2, 3, which are formed on an outside surface of the corresponding suction holder 21 in an angularly and equally spaced manner. A stop 45 is also formed on the outside surface of the suction holder 21 at a location adjacent to one of the two fourth steps 44 to correspond to a raised portion 311 formed on a handgrip 31 of the corresponding rotary knob 30, whereby when the handgrip 31 is angularly moved to an extreme position, the raised portion 311 engages the stop 45 to prevent further rotation or angular movement of the handgrip 31.

Each suction element 22 comprises an upright post 221 from which the guide pegs 222 extend sideways to make the suction element 22 vertically movable, but not angularly movable or rotatable. A top end of the upright post 221 forms an inner-threaded hole 223. Each rotary knob 30 comprises a handgrip 31, a spacer ring 32, a bolt 33, and a cap 34. The handgrip 31 has an under surface that forms a multi-step stepwise projection 50 corresponding in geometry and size to the multi-step stepwise recess 40 of the corresponding suction holder 21. The multi-step stepwise projection 50 is comprised of two sets of a fourth step 51, which is of a greatest height, a third step 52, which is of a second greatest height, a second step 53, which is of a second lowest height, and a first step 54, which is of a lowest height. The steps 51, 52, 53, 54 of the two sets are sequentially arranged and preferably equally spaced and respectively correspond to the eight sequentially arranged position marks of the corresponding suction holder 21 in the sequence of 3, 2, 1, 0, 3, 2, 1, 0.

To assemble, the upright post 221 of each suction element 22 extends through the corresponding resilient element 23 and the central bore 211 of the corresponding suction holder 21 with the guide pegs 222 slidably received in the slots 212 of the suction holder 21. The multi-step stepwise projection 50 of each handgrip 31 is set in and overlapping stacked on the multi-step stepwise recess 40 of the corresponding suction holder 21. Each handgrip 31 forms a stepped bore 312 (see FIG. 6) that receives the corresponding spacer ring 32 therein. The upright post 221 of the suction element 22 is fit through the spacer ring 32 and the bolt 33 extends through the spacer ring 32 to engage the inner-threaded hole 223 of the suction element 22. Then, the stepped bore 312 of the handgrip 31 is closed by the cap 34. This completes the assembling of the stepwise powerful suction device of the present invention.

Safety locking means is provided between the multi-step stepwise recess 40 and the multi-step stepwise projection 50, comprising a groove 401 formed in each of the steps 41-44 of the multi-step stepwise recess 40 and a corresponding rib 501 formed on each of the steps 51-54 of the multi-step stepwise projection 50. When the multi-step stepwise projection 50 undergoes an angular movement with respect to the multi-step stepwise recess 40 to reach each one of a plurality predetermined engaging positions that is defined by inter-engagement between the steps 41-44 and the steps 51-54, the rib 501 of the step 51-54 of the multi-step stepwise projection 50 and the groove 401 of the inter-engaging step 41-44 of the multi-step stepwise recess 40 engage each other to lock the step 51-54 of the multi-step stepwise projection 50 with respect to the steps 41-44 of the multi-step stepwise recess 40. This prevents the handgrip 31 that forms the multi-step stepwise projection 50 from unexpectedly disengaging from and moving away from the designated engaging position.

It is apparent that the multi-step stepwise recess 40 of the suction holder 21 can be comprised of less or more steps, such as three angularly and equally spaced steps that are sequentially of a greatest depth, a second greatest depth, and a shallowest depth, or alternatively six angularly and equally spaced steps, which are sequentially of a greatest depth, a second greatest depth, a shallowest depth, the greatest depth, the second greatest depth, and the shallowest depth.

Similarly, the multi-step stepwise projection 50 formed on the under surface of the handgrip 31 corresponding to the multi-step stepwise recess 40 of the suction holder 21 can alternatively be comprised of at least three angularly and equally spaced steps that are sequentially of a greatest height, a second greatest height, and a lowest height, or further alternatively at least six angularly and equally spaced steps, which are sequentially of a greatest height, a second greatest height, a lowest height, the greatest height, the second greatest height, and the lowest height.

Figure 5:
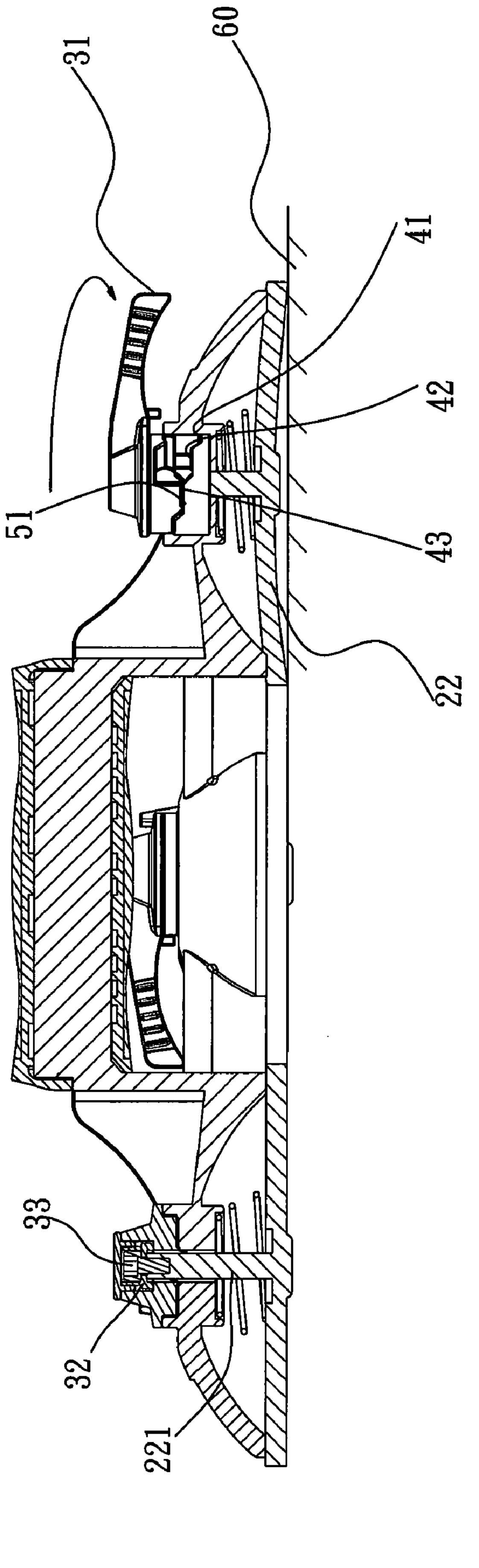
FIG. 5 is a cross-sectional view of the stepwise powerful suction device of the present invention.
Figure 6:
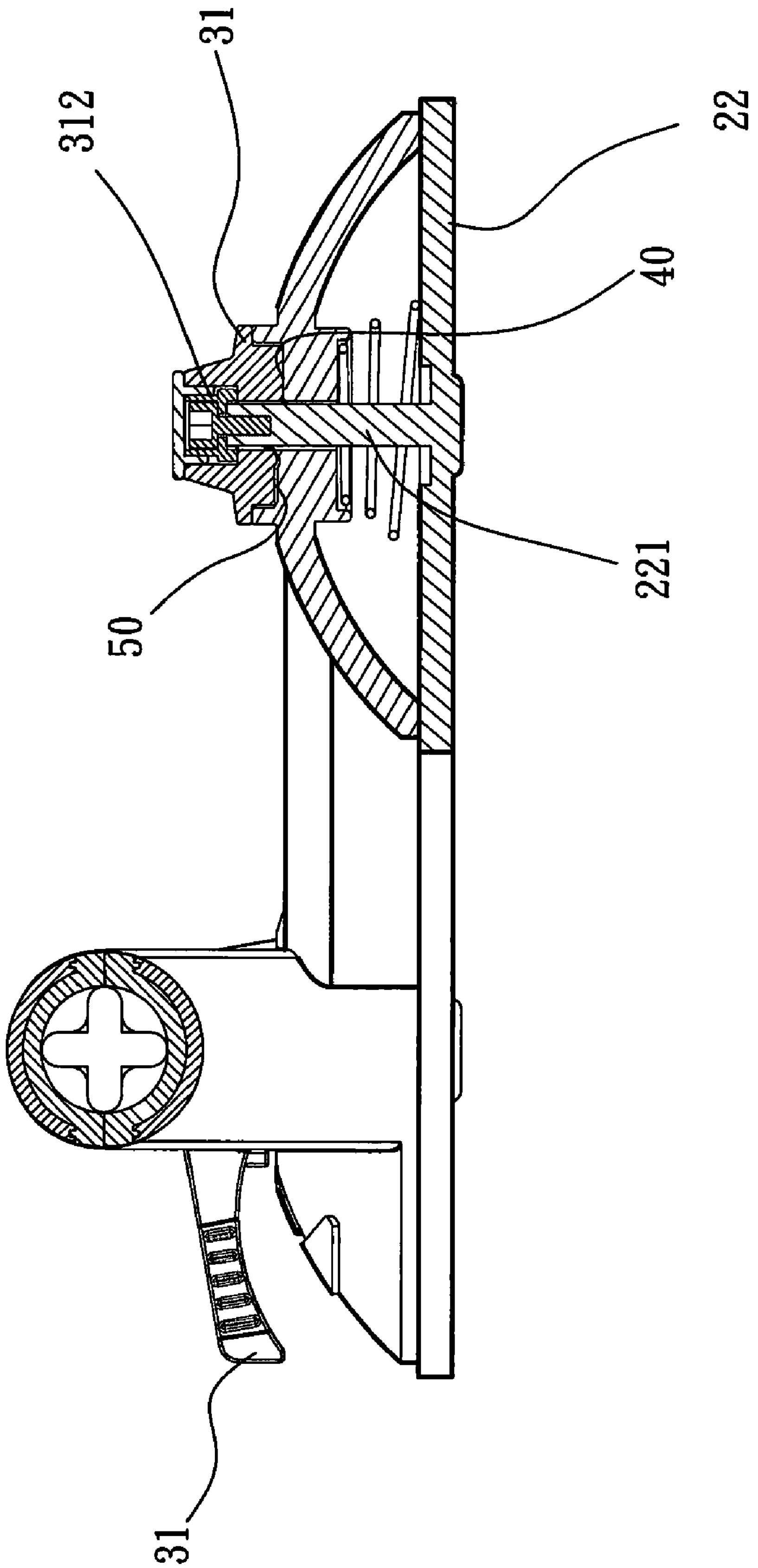
FIG. 6 is another cross-sectional view of the stepwise powerful suction device of the present invention.

Referring to FIGS. 5 and 6, to operate, the handgrip 31 is rotated to a desired engaging position, depending upon whether the glass panel or the board 60 that is to be held is a thick panel or board, or a thin panel or board. When the handgrip 31 is rotated in such way that the fourth step 51 (see FIG. 4) of the multi-step stepwise projection 50 thereof is stacked on the third step 43 of the multi-step stepwise recess 40 of the corresponding suction holder 21, a suction force of a second greatest magnitude is generated, which can be used to suck at and hold a glass panel 60 of a second greatest thickness. In the same way, to suck at and hold a glass panel or board of a different thickness, the handgrip 31 is rotated to an engaging position corresponding to a desired mark of the suction holder 21. During the rotation of the handgrip 31, due to the separation realized through the spacer ring 32, the rotating power is not transmitted to the bolt 33. When the handgrip 31 undergoes rotation, the multi-step stepwise projection 50 thereof is caused to climb upward the multi-step stepwise recess 40 (see FIG. 4), which lifts the upright post 221 of the suction element 22 upwards. The upward movement of the upright post 221 induces a vacuum suction force inside the suction element 22 that sucks at and holds the glass panel or board 60.

Figure 7:
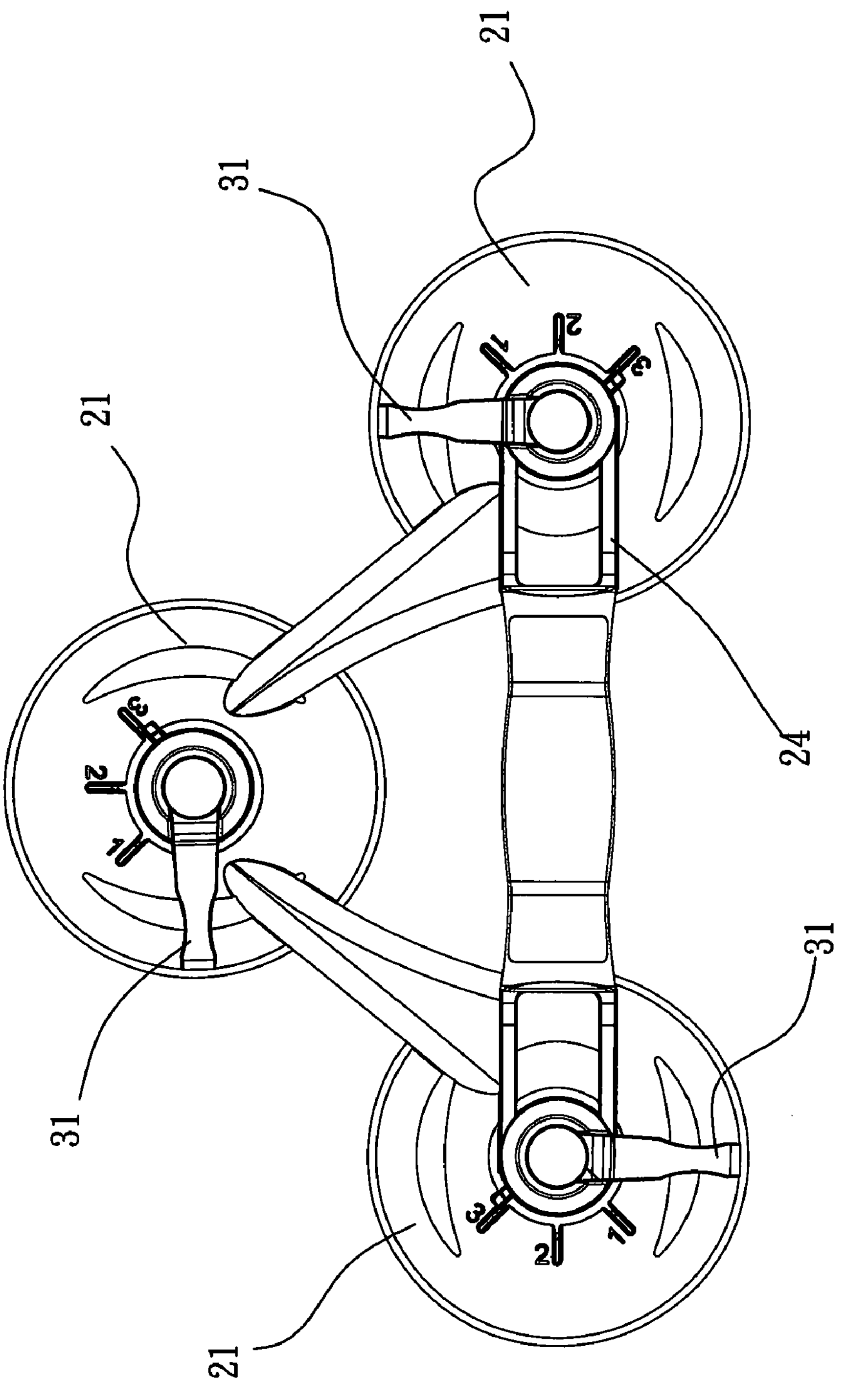
FIG. 7 is a top view of the stepwise powerful suction device of the present invention that comprises three suction elements.
Figure 8:
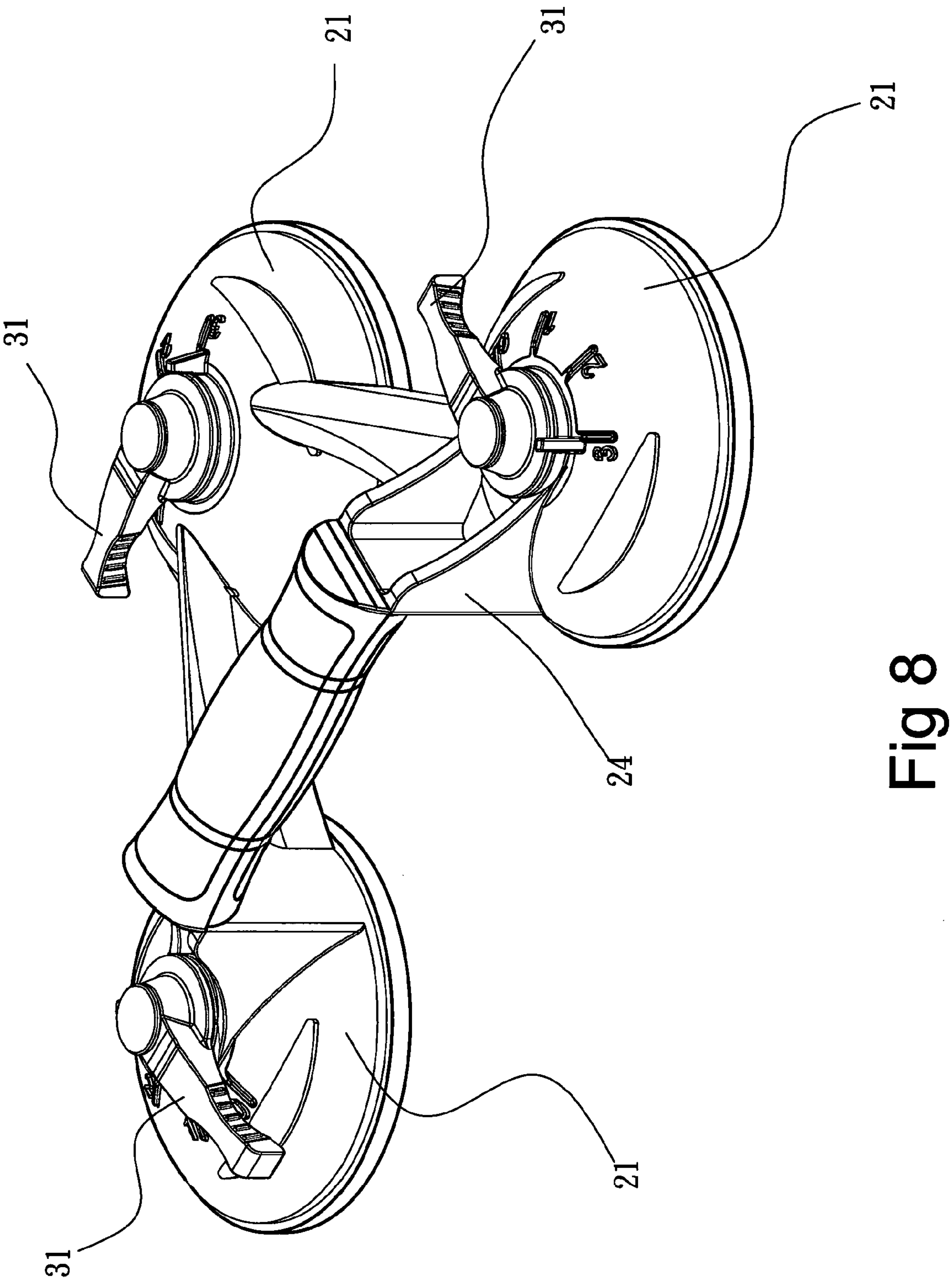
FIG. 8 is a perspective view of the stepwise powerful suction device of the present invention that comprises three suction elements.

FIGS. 7 and 8 show a top view and a perspective view of the three-suction-element stepwise powerful suction device discussed above. The suction device comprises a combination of three suction elements that is supported by the suction holders 21 that are integrally formed with the support frame 24 and that are operated by rotary handgrips 31.

Figure 9:
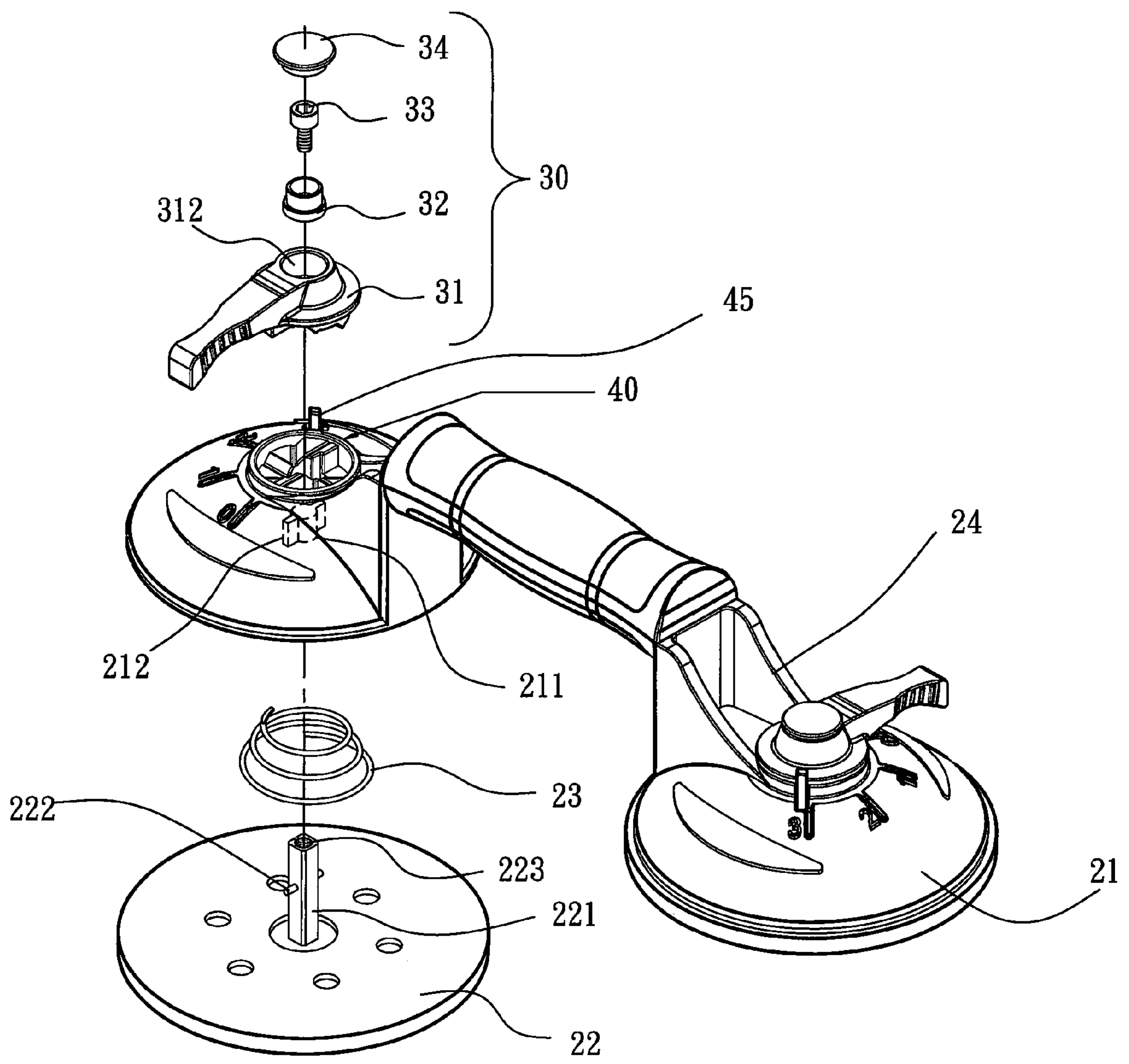
FIG. 9 is an exploded view of a stepwise powerful suction device constructed in accordance with another embodiment of the present invention that comprises two suction elements.
Figure 10:
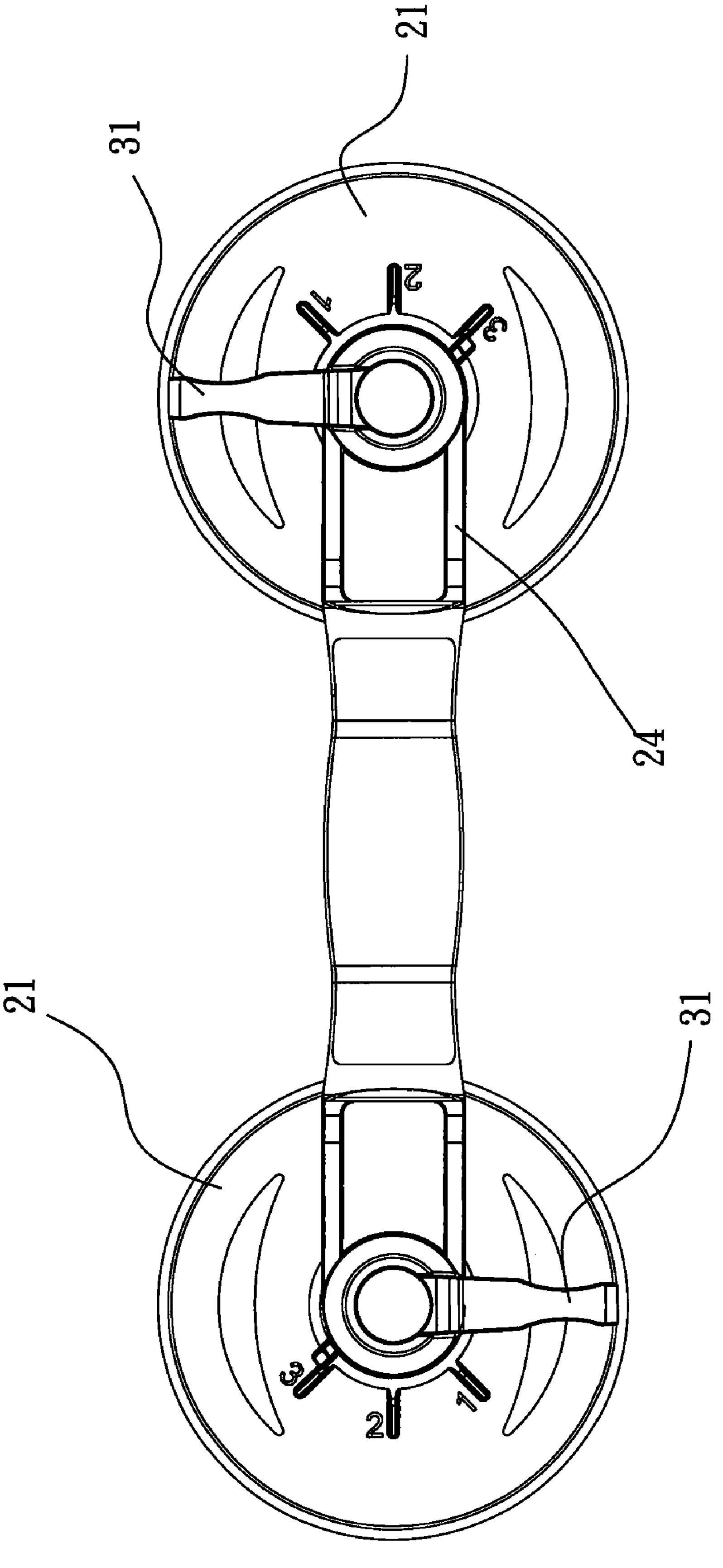
FIG. 10 is a top view of the stepwise powerful suction device of the present invention that comprises two suction elements.
Figure 11:
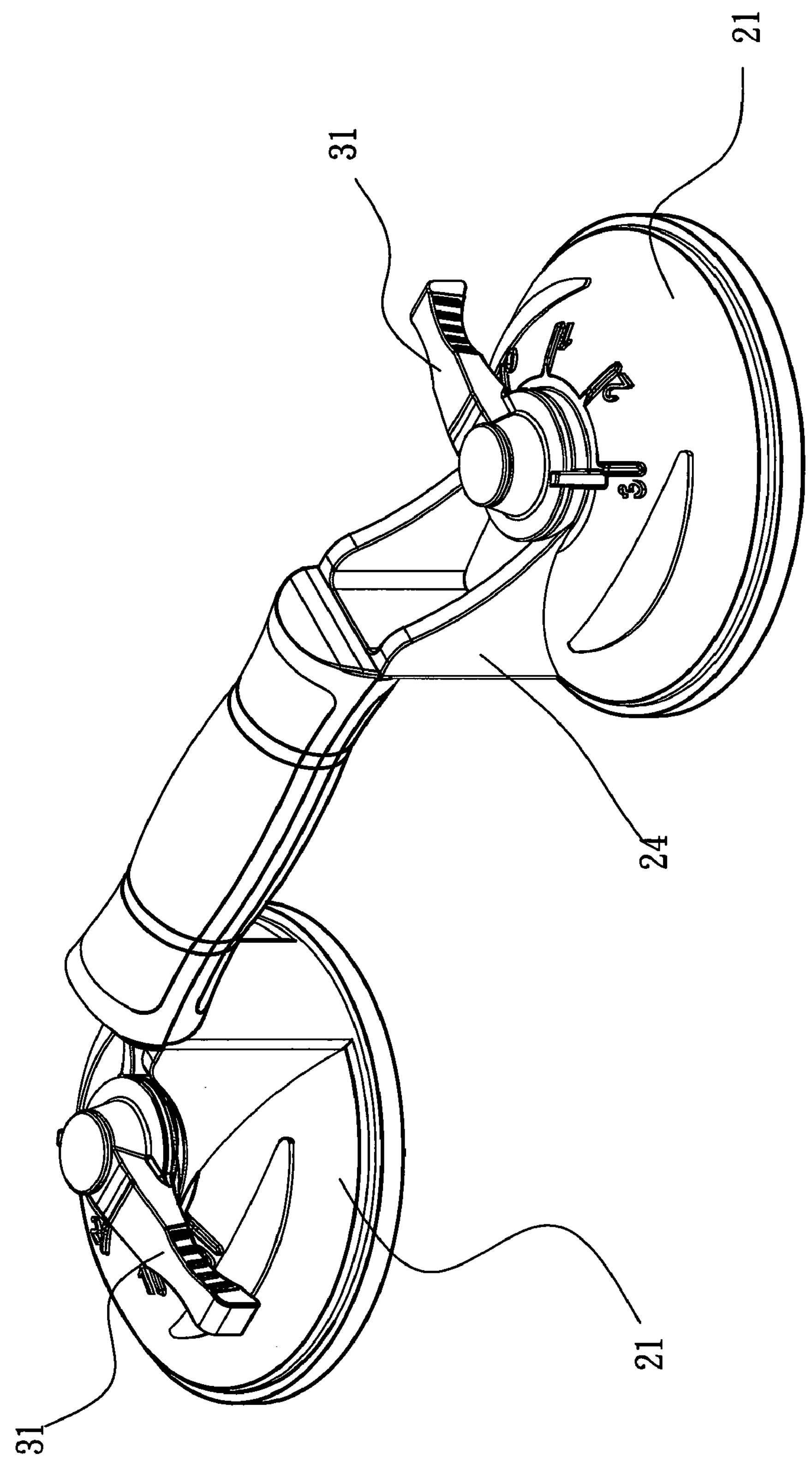
FIG. 11 is a perspective view of the stepwise powerful suction device of the present invention that comprises two suction elements.

Referring to FIGS. 9-11, which are an exploded view, a top plan view, and a perspective view of a stepwise powerful suction device constructed in accordance with another embodiment of the present invention, the stepwise powerful suction device of said another embodiment of the present invention comprises a combination of two suction elements that is respectively supported by two suction holders 21 that are integrally formed with a support frame 24. Each suction holder 21 forms a multi-step stepwise recess 40, a central bore 211, and one or more slots 212 that slidably receive guide pegs 222 of an upright post 221 of a corresponding one of the two suction elements 22. The suction holder 21 forms, on an outside surface thereof, a stop 45 at a location adjacent to the multi-step stepwise recess 40. Each of the suction elements 22 comprises the upright post 221 and at least one guide peg 222. The upright post 221 has a top end forming an inner-threaded hole 223. The upright post 221 extends through a resilient element 23 and the central bore 211 of the corresponding suction holder 21 with the guide peg(s) 222 respectively received in the slot(s) 212. A rotary knob 30 is associated with each suction holder 21 and the associated suction element 22. The rotary knob 30 comprises a handgrip 31 that forms a multi-step stepwise projection 50 to stackingly mate the multi-step stepwise recess 40 of the corresponding suction holder 21. The handgrip 31 forms a stepped bore 312 to receive a spacer ring 32. A bolt 33 extends through the spacer ring 32 and threadingly engages the inner-threaded hole 223 of the upright post 221. A cap 34 then closes the stepped bore 312 of the handgrip 31. As such, a stepwise powerful suction device is formed. When the rotary knob 30 is rotated, the multi-step stepwise projection 50 climbs upward the multi-step stepwise recess 40 to lift the upright post 221 upward, which causes the suction element 22 to generate vacuum suction force. The higher the climbing is, the greater the suction will be, this being applicable to sucking at and holding a glass panel or a board of a large thickness; and the lower the climbing is, the smaller the suction will be, this being applicable to sucking at and holing a glass panel or a board of a small thickness. No climbing indicates no suction force is generated.

Figure 12:
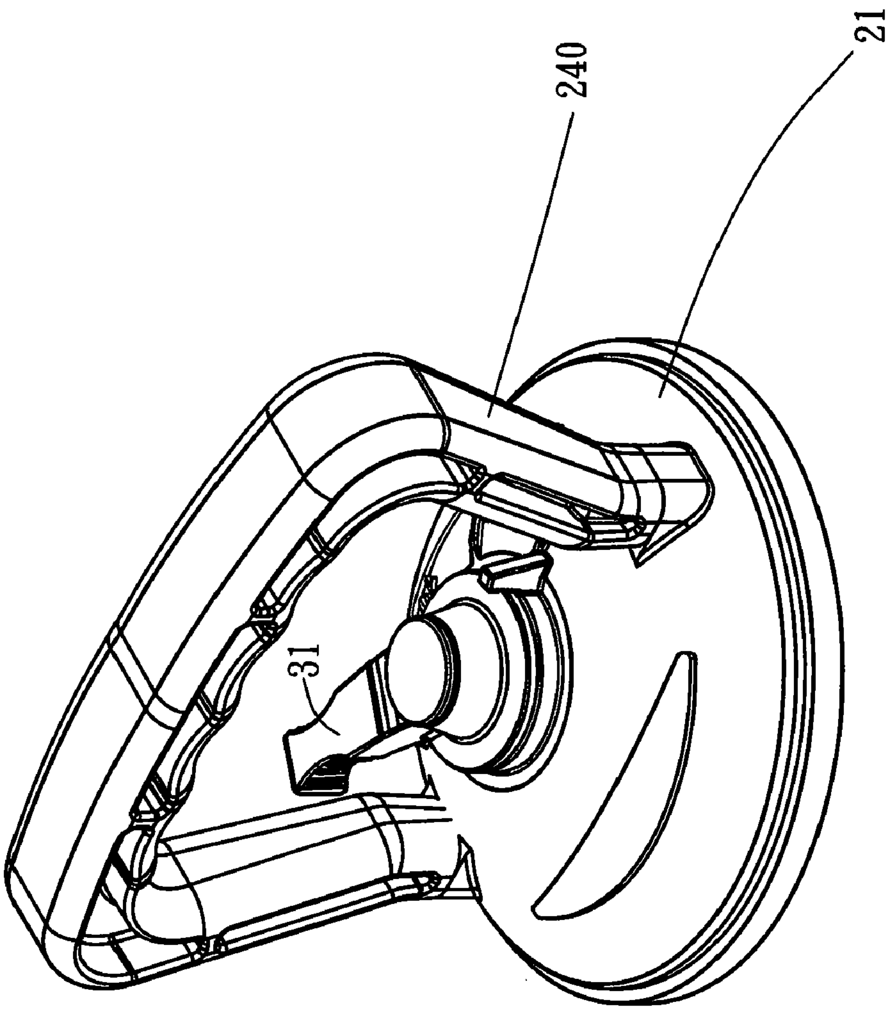
FIG. 12 is a perspective view illustrating a stepwise powerful suction device constructed in accordance with a further embodiment of the present invention that comprises a single suction element.

Referring to FIG. 12, which shows a perspective view of a stepwise powerful suction device constructed in accordance with a further embodiment of the present invention, the suction device of said further embodiment of the present invention comprises a single suction element that is supported by a suction holder 21 integrally formed with a support frame 240. The suction holder 21 is provided with a handgrip 31 that operates to change the suction force induced by the suction element in substantially the same way as what described above with reference to the previous embodiments.

The advantages of the stepwise powerful suction device of the present invention are:

(1) A novel structure for realizing stepwise powerful suction is provided, which may employ a suction element assembly comprising a single suction element, two suction elements, three suction elements, or more than three suction elements to provide a powerful suction force and which selectively generate a suction force of a proper magnitude in accordance with the thickness of a panel or board to be held, so that the stepwise powerful suction device is applicable to panels or boards of various thicknesses and the suction force generated thereby is of a proper magnitude that does not cause breaking or fracture of the panel or board. The operation is thus safe and risk of breaking glass panels or boards can be reduced.

(2) A unique feature of the stepwise powerful suction device of the present invention is to replace the conventional switching type suction generating operation with mated multi-step stepwise structures, which are operated through rotation of a rotary handgrip, wherein, in particular, the handgrip forms a multi-step stepwise projection that stackingly mate a multi-step stepwise recess formed in a suction holder so that the rotation of the handgrip causes the multi-step stepwise projection to climb upward the multi-step stepwise recess in a multiple step manner of which each step represents an individual magnitude of the suction force so generated. Thus, the stepwise powerful suction device is applicable to a glass panel or a board of a large thickness by generating a large suction force and is also applicable to a glass panel or a board of a small thickness by generating a small suction force. The stepwise powerful suction device is thus applicable to panels or boards of various thicknesses.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A stepwise powerful suction device comprising:

at least one suction holder, a suction element associated with each suction holder, a resilient element associated with each suction holder, a support frame, and a rotary knob associated with each suction holder;

wherein the support frame is integrally formed with the suction holder and a portion of the suction holder forms a handle;

wherein the suction holder forms a central bore and a multi-step stepwise recess, the central bore having an inside surface in which at least one slot is formed, the multi-step stepwise recess comprising at least two sets of a first deepest step, a second next deepest step, a third next shallowest step, and a fourth shallowest step that are sequentially arranged and respectively corresponding to two sets of first, second, third, and fourth marks formed on an outside surface of the suction holder;

wherein the suction element comprises an upright post to which a guide pegs is mounted for being slidably received in the slot of the suction holder, the upright post having a top end forming an inner-threaded hole;

wherein the rotary knob comprising a rotatable handgrip, a spacer ring, a bolt, and a cap, the handgrip having an under surface that forms a multi-step stepwise projection corresponding to the multi-step stepwise recess of the suction holder, the multi-step stepwise projection comprising at least two sets of a fourth highest step, a third next highest step, a second next lowest step, and a first lowest step that are sequentially arranged and respectively corresponding to the two sets of first, second, third, and fourth marks formed on the outside surface of the suction holder, a stop being formed on the outside surface of the suction holder at a location adjacent to one of the fourth shallowest steps to correspond to a raised portion formed on the handgrip, whereby when the handgrip is rotated to an extreme angular position, the raised portion engages the stop to prevent further rotation of the handgrip;

wherein safety locking means is provided between the multi-step stepwise recess and the multi-step stepwise projection, the safety locking means comprising a groove formed in each of the steps of the multi-step stepwise recess and a corresponding rib formed on each of the steps of the multi-step stepwise projection, whereby when the multi-step stepwise projection is rotated to reach each of a plurality predetermined engaging positions, the rib and the groove engage each other to lock the multi-step stepwise projection with respect to the multi-step stepwise recess;

wherein the upright post of the suction element extends through the resilient element and the central bore of the suction holder with the multi-step stepwise projection of the handgrip stacked on and mating the multi-step stepwise recess of the suction holder, the handgrip forming a stepped bore that receives the spacer ring therein, the upright post of the suction element being fit through the spacer ring, the bolt extending through the spacer ring and engaging the inner-threaded hole of the upright post of the suction element, the cap then closing the stepped bore of the handgrip, whereby when the handgrip is rotated to cause relative rotation between the multi-step stepwise projection and the multi-step stepwise recess, the upright post of the suction element is lifted by different distances to induce different and stepwise suction forces in the suction element.

2. The stepwise powerful suction device as claimed in claim 1, wherein the multi-step stepwise recess of the suction holder comprises at least three sequentially arranged and equally spaced steps including, in sequence, a first deepest step, a second next deepest step, and a third shallowest step or alternatively comprises at least six sequentially arranged and equally spaced steps including, in sequence, a first deepest step, a second next deepest step, a third shallowest step, another first deepest step, another second next deepest step, and another third shallowest step.

3. The stepwise powerful suction device as claimed in claim 1, wherein the resilient element comprises a compression spring.

4. The stepwise powerful suction device as claimed in claim 1, wherein the portion of the support frame forms a handle that is selectively of various shapes.

5. The stepwise powerful suction device as claimed in claim 1 comprising a plurality of suction holders, each of which is associated with a suction element, a resilient element, and a rotary knob, and the suction holders being mounted to the support frame.

6. A stepwise suction device comprising:

a suction holder forming a recess in which a first multiple-step stepwise structure is formed, the first stepwise structure comprising a first step and a second step respectively having first and second depths with respect to an outside surface of the suction holder, the first depth being different from the second depth;

an operation member coupled to the suction holder, the operation member forming a projection movably received in the recess of the suction holder, the projection forming a second multiple-step stepwise structure comprising a first step and a second step respectively having a first height and a second height with respect to the operation member, the first height being different from the second height, the steps of the projection being selectively engageable with the steps of the recess to form a plurality of combinations of engagement between the steps of the projection and the recess, whereby the operation member is switchable among a plurality of operation conditions respectively corresponding to the plurality of combinations of engagement between the steps; and a suction element coupled to the operation member and movable with respect to the suction holder in response to the operation member switching among the plurality of operation conditions to induce different suction forces.

7. A stepwise suction device comprising:

a suction holder forming a recess in which a first multiple-step stepwise structure is formed, the first stepwise structure comprising a plurality of recess-side steps having different depths with respect to an outside surface of the suction holder, the plurality of recess-side steps being arranged along a circumference of the recess an operation member coupled to the suction holder, the operation member forming a projection rotatably received in the recess of the suction holder, the projection forming a second multiple-step stepwise structure comprising a plurality of projection-side steps having different heights with respect to the operation member, the projection-side steps being arranged along a circumference of the projection and selectively engageable with the recess-side steps of the suction holder to form a plurality of combinations of engagement between the projection-side steps and the recess-side steps, whereby the operation member is rotatable with respect to the suction holder to be switchable among a plurality of operation conditions respectively corresponding to the plurality of combinations of engagement between the projection-side steps and the recess-side steps; and a suction element coupled to the operation member and movable with respect to the suction holder in response to the operation member switching among the plurality of operation conditions to induce different suction forces.

8. The stepwise suction device as claimed in claim 7, wherein the first multiple-step stepwise structure comprises four steps equally spaced along the circumference of the recess and wherein the second multiple-step stepwise structure comprises four steps equally spaced along the circumference of the projection.

9. The stepwise suction device as claimed in claim 7, wherein the first multiple-step stepwise structure comprises two sets of four steps equally spaced along the circumference of the recess and wherein the second multiple-step stepwise structure comprises two sets of four steps equally spaced along the circumference of the projection.

10. The stepwise suction device as claimed in claim 7 further comprising locking means arranged between the first and second multiple-step stepwise structures, wherein the locking means comprises a groove defined in each step of one of the first and second structures and a rib formed on each step of the other one of the first and second structures and engageable with the groove of the corresponding step of said one of the first and second structures.

11. The stepwise suction device as claimed in claim 7, wherein the outside surface of the suction holder forms a plurality of marks respectively corresponding to the recess-side steps to indicate the combinations of engagement between the recess-side steps and the projection-side steps.

* * * * *